Patented Feb. 22, 1949

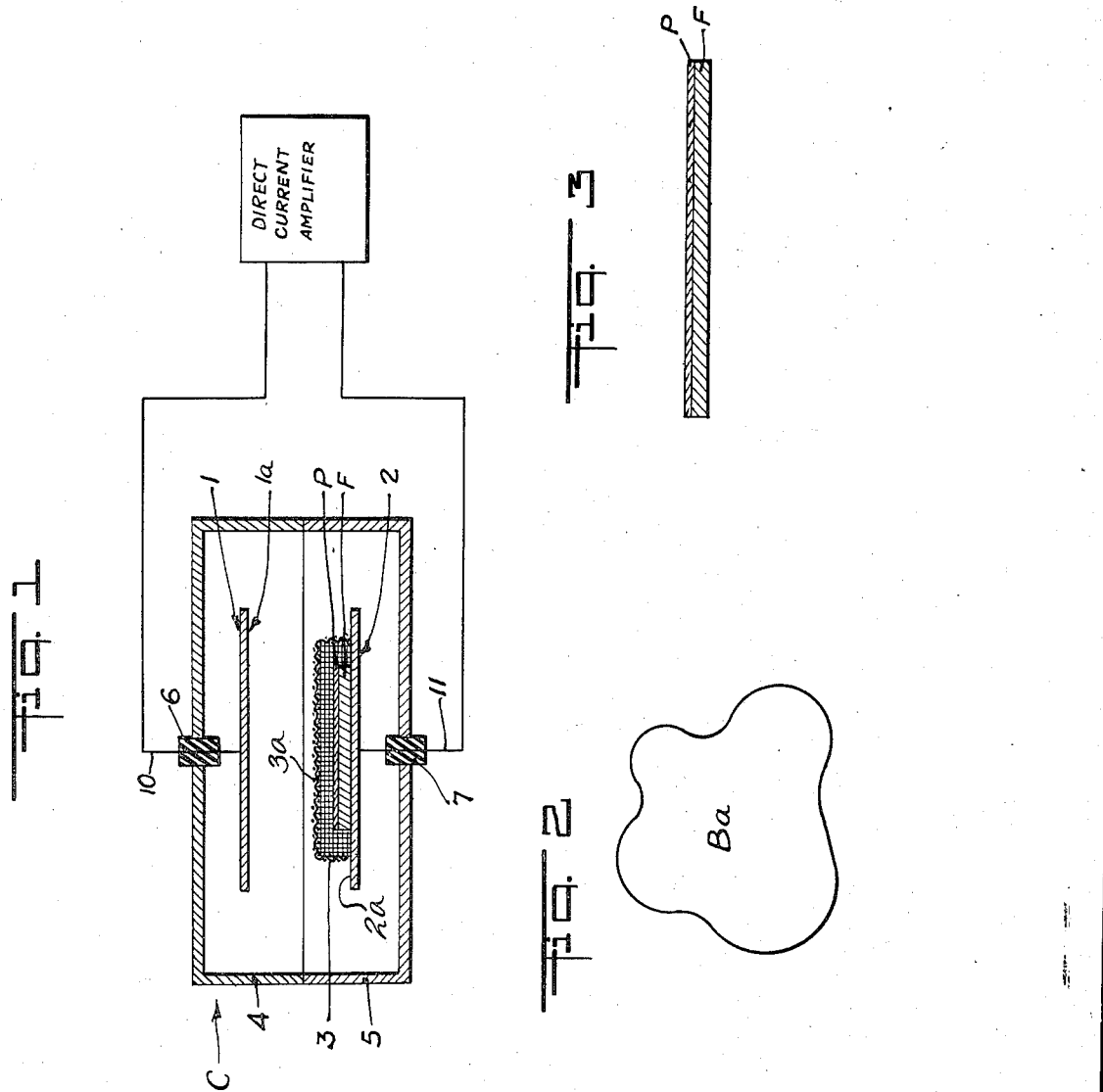

2,462,351

UNITED STATES PATENT OFFICE 2,462,351

AREA MEASURING DEVICE AND METHOD

Marietta Blau, New York, and Jack Raymond Carlin, Brooklyn, N. Y., assignors to Canadian Radium & Uranium Corporation, New York, N. Y., a corporation of New York Application October 22, 1946, Serial No. 704,834

16 Claims. (Cl. 250—83.6)

Our invention relates to a new and improved area-measuring device and method.

It is often necessary to determine the area of a sheet of paper which is enclosed by a curve and a straight line. Thus, when an oscillogram graph is recorded by an oscillograph on a sheet of paper, it is often necessary to determine the area which is enclosed by the respective sections of the oscillogram curve and the straight-line axis of the curve.

The determination of such area or areas is frequently necessary in interpreting many other graphs which are marked upon thin paper of the type which is used for printing and writing. This paper may be so thin that it is light-permeable.

Since each such section is of irregular outline, it has heretofore been necessary to use a large and expensive and relatively inaccurate integraph for this purpose. When the paper is thin, and the area of the graph is small, and the graph is of irregular outline, it is difficult to use the integraph, and its reading is not accurate.

For many purposes, it is necessary to determine the area of a small piece of thin metal foil, which may be of irregular outline. This has been done heretofore by weighing the piece of foil, and then calculating its area from its specific gravity. Since it is difficult to determine the weight of the piece of foil with great accuracy, such determination has not been accurate.

Without limiting our invention to any specific example, we use two plates or electrodes which are separated from each other by an ionizable medium, such as air at normal pressure of 760 millimeters of mercury, and at a temperature of 20° C.-25° C. Said pressure and temperature are designated as standard conditions. These electrodes have proximate faces which are planar and parallel to each other. Said electrodes are preferably of equal thickness. This ionizable medium is preferably free from dust and water-vapor, so that it is non-conducting when it is non-ionized.

We connect such plates or electrodes respectively to the respective terminals of a source of voltage, such as the plus and minus terminals of a battery which delivers a constant and unidirectional voltage. This applied voltage is insufficient to send a current through the ionizable medium, when it is non-ionized.

For convenience, one of these electrodes is designated as the emitting electrode, and the other electrode is designated as the receiving electrode.

A sheet of metal foil is releasably and conductively applied to the proximate face of the emitting electrode. This sheet of metal foil has an exposed planar face which is parallel to the planar proximate faces of the electrodes.

A planar layer of polonium is applied to the exposed face of said metal foil. This layer of polonium is parallel to the proximate faces of the electrodes.

This layer of polonium emits alpha rays. In air at a pressure of 760 millimeters of mercury and at a temperature of 15° C., the average range of the alpha rays which are emitted from polonium, is 3.87 centimeters. It is well-known that alpha rays are emitted from polonium at different respective velocities, and that the range of an alpha ray increases when its velocity of emission is increased.

Under said standard conditions, and using polonium as the source of the alpha rays, the distance between the polonium layer and the proximate face of the receiving electrode, measured along a line which is perpendicular to said layer and to said proximate receiving face, is four centimeters. This distance may be less than four centimeters. This distance is preferably equal to or slightly less than, the maximum range of the alpha particles in the ionizable medium. If desired, said distance may be adjusted so that a selected proportion of the alpha rays reach the proximate receiving face.

The electrostatic field between the electrodes has parallel lines of force, which are perpendicular to the polonium layer and to the planar electrodes.

The applied voltage is selected, so as to produce a saturation ionization current through the ionizable medium. If such ionizable medium is pure air under said standard conditions, and if said spacing is about four centimeters, and polonium is used as the source of alpha rays, such saturation ionization current is produced when the applied voltage is in a range of 50–2,000 volts. In such case, when a fresh polonium layer is used, the saturation ionization current is of the order of $10^{-7}$ amperes or 0.1 microampere.

The half-life of polonium is 140 days. Hence, during the period of use of a respective polonium layer, its alpha-ray emission will decrease, and the saturation ionization current will decrease, if other conditions are the same.

The circuit of the battery and the electrodes includes a sensitive meter, which can measure the saturation ionization current. This circuit may include an adjustable resistance, in addition to the resistance of the ionization path. The resistance of the ionization path can be adjusted, by adjusting the spacing between the polonium layer and the proximate receiving face. Preferably, the resistance of the circuit is adjusted by adjusting said adjustable resistance, while maintaining said spacing fixed.

When a fresh polonium layer is used, the resistance of the battery circuit is selected so that the meter has its maximum reading, so as to indicate the maximum saturation ionization current when the polonium layer is wholly unobstructed or uncovered, so that all the emitted alpha rays, or all of the selected proportion of the emitted alpha rays, reach the proximate receiving surface.

In a part of the polonium layer is covered or obstructed by the test body, which absorbs the obstructed alpha rays, the maximum ionization saturation current will diminish to a lower value of saturation ionization current, which is indicated by the meter, thus providing an accurate measurement of the obstructing area of the test body.

As the polonium layer becomes partially exhausted, so that its alpha ray emission decreases with a corresponding decrease from maximum initial saturation ionization current to a lower saturation ionization current under the same applied voltage, the resistance of the circuit is diminished, so that the reading of the meter, before applying the test body, will be the same as when a fresh polonium layer was originally used. Hence the measurement of the obstructing area is not affected by the partial exhaustion of the polonium layer.

When the alpha ray emission of the polonium layer becomes too low, it can readily be replaced by means of another sheet of metal foil, which has a fresh layer of polonium.

We optionally use a canalizing or collimating device, which causes the alpha rays to move in parallel lines which are perpendicular to the polonium layer and to said proximate planar faces. Said canalizing device has a wall of wire mesh, which is conductively connected to one of the electrodes, preferably to the positive electrode or anode. This wall of wire mesh is planar and parallel to the layer of polonium.

This wire-mesh wall is located between the layer of polonium and the proximate receiving face.

When such canalizing device is used, the test object is placed on said wire-mesh wall. When such canalizing device is not used, the test object is placed on the polonium layer.

It is known that when a gas is ionized between an anode and a cathode to produce an ionization current, such ionization current has three stages.

In the first stage, some of the positive and negative particles which are formed by the ionization, recombine to form neutral particles, and some of said charged particles diffuse to the respective electrodes. In this first stage, the applied voltage is below the voltage of the second stage, which is the stage of saturation ionization current. In this first stage, the ionization current increases as the applied voltage is increased.

In the second stage, all the positively charged particles are drawn to the cathode and all the negatively charged particles are drawn to the anode. In this second stage, there is a substantial range of applied voltage, in which the current is a saturation ionization current, and said saturation ionization current remains constant or substantially constant, when the applied voltage is varied through the range of saturation ionization voltage. This saturation ionization current measures the total number of ions which are produced by the emitted alpha rays. This is the stage which we prefer to use. In such case, when the intensity of ionization radiation is diminished, the saturation ionization current drops to a lower saturation value.

There is a third stage which results when the applied voltage is increased above the range of the second stage. In this third stage, the ionization current rapidly increases as the voltage is increased, until a brush discharge or a spark discharge is produced. We do not use the high applied voltage which results either in a brush discharge or a spark discharge.

We prefer to use an ionization current which is sufficiently small, so that the change in ionization current can be measured by an electrometer, such as an electrometer of the quadrant type. Various electrometers of this type are described at pages 396–408 of "Electron & Nuclear Physics" by J. Barton Hoag, published in 1938 by D. Van Nostrand Company Inc.

We can also use any standard direct current amplifier, various types of which are described at pages 408–409 of said text-book.

Other objects and improvements of our invention are stated in the annexed description and diagrammatic drawings, which illustrate a preferred embodiment thereof.

The drawings are not to scale.

Fig. 1 illustrates the invention, as used with a conventional direct current amplifier which has an electrometer tube.

Fig. 2 is a top plan view of a test body Ba of irregular outline. This test body Ba may be made of paper, metal, foil, or other material which absorbs or obstructs alpha rays.

Fig. 3 is a sectional view, which illustrates the polonium layer P, and its carrier metal foil F.

The ionization chamber C has a wall made of glass, quartz, or other non-conduction material. The wall of chamber C consists of two parts 4 and 5, which interfit closely, so as to exclude dust, water-vapor, etc.

The electrodes or plates 1 and 2 have proximate faces 1a and 2a, which are planar and parallel to each other. These electrodes 1 and 2 are preferably of equal thickness. Electrode 1 is connected to a rigid wire 10, which extends through plug 6, which extends through and is fixed to part 4.

Electrode 2 is similarly connected to rigid wire 11, which extends through plug 7, which extends through and is fixed to part 5. Plugs 6 and 7 may be made of insulating material. Wires 10 and 11 are respectively connected to the respective input terminals of a direct current amplifier, which includes an electronic tube, such as a tetrode, a triode, etc. The connections of the direct current amplifier, its galvanometer, etc. are not illustrated, since this amplifier is well known per se.

In this embodiment, electrode 2 is the emitting electrode, and electrode 1 is the receiving electrode.

The planar metal foil F is conductively and closely applied to proximate face 2a. Foil F may be nickel foil, having a thickness of one millimeter. A planar layer P of polonium is applied to the exposed face of foil F. Layer P is parallel to proximate faces 1a and 2a.

The chamber C is filled with air under said standard conditions. Said air filling is preferably free from dust, water-vapor and other ingredients which may affect the desired ionization by the alpha rays.

The use of the canalizing device 3 is optional.

This canalizing device 3 is made of wire mesh. The wire may be No. 300 mesh in the U. S. Standard Specifications for sieves, so that the opening of the mesh is about 0.05 millimeter.

This device 3 has a vertical mesh wall which is conductively fixed to electrode 2. Said device 3 also has a top mesh-wall 3a which is planar and parallel to layer P and to proximate faces 1a and 2a. Electrode 2 may be the anode or cathode. If foil F or device 3 are conductively fixed to electrode 2, it is preferred that this electrode 2 should be the anode or positive electrode. In general, it is preferred that foil F should be fixed to the anode, but the invention is not limited thereto. In this embodiment, the proximate faces 1a and 2a are shown in the horizontal position, and the vertical distance between proximate face 1a and layer P is substantially 4 centimeters.

Fig. 1 shows a part of the vertical wall of device 3 broken away, in order to show foil F and layer P.

The device 3 causes the alpha rays to move in straight parallel lines, which are perpendicular to layer P and to proximate faces 1a and 2a. The height of the vertical wall of device 3 may be 3 centimeters. The vertical wall of device 3 may be of any shape. It is sufficient if the top wire-mesh wall 3a of device 3 extends beyond layer P in all directions, and said top wire-mesh wall 3a is conductively connected to the respective electrode in any manner.

If the device 3 is not used, the test body Ba may be directly applied to layer P.

If device 3 is used, the test body Ba is applied to said top wire-mesh wall 3a.

The use of polonium is preferred, as compared to radium, because it is much more easy to coat a large area with polonium than with radium, and the alpha ray emission of polonium is more uniform than that of radium. However, the invention is not limited to any source of alpha rays or ionizing rays.

Instead of using a test body Ba which is a thin sheet of paper, preferably of uniform thickness, which abuts a part of layer P at the entire area of test body Ba, said test body may be a sphere, cylinder, cone, etc. In such case, the test body obstructs and absorbs the alpha rays, at a cross-sectional area of the test body which is perpendicular to the alpha rays.

As an example, the volume of a cylinder can be measured, by first supporting the cylinder on layer P with the axis of the cylinder held vertically, and then supporting the cylinder on layer P with the axis of the cylinder held horizontally. Such cylinder may be thus applied to the top wire-mesh wall 3a of device 3.

The area of the irregular cutting edge of a cutting die can also be readily determined, by supporting said cutting edge on layer P or on the wire-mesh top wall 3a of device 3, if the wall of the die is either vertical or tapered.

A dispersion or suspension of micro-organisms or of other small bodies in water or in other liquid can be spread upon layer P, and the liquid of such dispersion can be wholly or substantially evaporated, so that the alpha rays are obstructed, only or substantially only by the solid residue of such dispersion or suspension. If the size of the micro-organisms or small bodies is known, the test will determine the number of such small bodies. Such small bodies may be fine particles of clay. A blood smear or other biological specimen can thus be tested.

If greater spacing of the electrodes is desired, the gaseous atmosphere of chamber C may be hydrogen or helium in which the alpha rays have a greater range.

The invention is not restricted to the use of planar electrodes and a planar layer P. Thus, the electrodes A and B and foil F and layer P may be cup-shaped, with proximate convex and concave faces, so that the alpha rays will travel in substantially parallel paths between the electrodes. This is secured in each case, because the electrostatic lines of force between the electrodes are parallel or substantially parallel.

While it is preferred to support the test object directly upon the polonium layer, the invention is not limited thereto. In its broader aspect, the invention is not limited to the use of polonium or to alpha rays as the effective ionizing source, but we greatly prefer to use polonium and alpha rays, because alpha rays are absorbed by thin paper of the type which is used for printing, writing, and other recording.

An ionizable vapor can be used instead of an ionizable gaseous medium.

The invention is not limited to the use of parallel applied alpha rays, but we prefer to use parallel applied alpha rays, in order to secure maximum accuracy.

In the preferred embodiment, the layer P is physically connected to one of the electrodes by foil F. In effect, foil F is a part of the respective electrode. The invention is not limited to this, because it is well-known to incorporate radio-active material into an electrode, at or very close to the surface of the electrode.

The test body may abut either the emitting electrode 2 or the receiving electrode 1. It is preferred to have only one emitting electrode, but the invention is not limited to the use of a single emitting electrode. Even if the emitting electrode is negative, by being connected to the negative terminal of a battery or other source of unidirectional and constant voltage, the alpha rays are efficiently emitted from the negative emitting electrode, under ordinary values of applied potential. The source of applied potential is not limited to a unidirectional source, because a source of alternating potential can be used. Of course, when an area is enclosed by a graph on a sheet of bendable paper or the like, said sheet is cut to the outline of said graph, to provide the test body Ba.

The invention is not limited to the use of a conductive carrier F for the polonium or other radio-active material. Hence the connection between the radio-active material and the electrode or electrodes may be a physical but non-conductive connection.

The ionizing means can be radium foils, in which the radium is incorporated in a suitable foil, in order to emit alpha particles. Likewise, means can be used for radiating beta rays, such as artificial radio-active substances which have a long half-life. These beta rays or electrons are more penetrating than alpha rays and less penetrating than gamma rays.

The test object can be supported directly upon the top mesh-wall 3a of the device 3.

We have described preferred embodiments of our invention, but numerous changes and omissions and additions can be made without departing from the scope of our invention.

We claim:

1. A method of making an area measurement of a test body, which consists in applying a difference of potential to electrodes which are spaced from each other and which are separated by an intermediate ionizable medium, said difference of potential being too low to send a brush discharge current through said intermediate ionizable medium, ionizing said medium by applied ionizing rays to produce an ionization current through said medium and between said electrodes which is proportional to the ionization effect of said ionizing rays, and locating said test body in said intermediate ionizable medium between said electrodes to obstruct only a part of said ionizing rays so as to decrease said ionization current between said electrodes, and measuring said decrease.

2. A method according to claim 1, in which said ionizing rays are produced from radio-active material which is connected to one of said electrodes.

3. A method according to claim 1, in which the electrostatic field between said electrodes has substantially parallel lines of force.

4. A method according to claim 1, in which said ionizing rays are produced from radio-active material which is connected to one of said electrodes, and the electrostatic field between said electrodes has substantially parallel lines of force.

5. A method according to claim 1, in which said ionizing rays are substantially alpha rays which are produced from radio-active material which is connected to one of said electrodes, said alpha rays moving in substantially parallel paths through said intermediate ionizable material.

6. A method according to claim 1, in which said ionizing rays are substantially alpha rays which are produced from radio-active material which is connected to one of said electrodes, and in which said test body abuts said last-mentioned electrode.

7. A method according to claim 1, in which the maximum ionization current and the decreased ionization current through said intervening ionizable medium are respective saturation ionization currents.

8. A method of making an area measurement on a thin and bendable test body which can be shaped into planar shape, said test body having the perimeter of said area, which consists in applying a difference of potential to electrodes which have proximate faces which are substantially planar and parallel to each other, at least one of said electrodes being an emitting electrode which has radio-active material which emits alpha rays at the respective proximate face of said emitting electrode, said electrodes being separated by an intermediate ionizable medium, said difference of potential being too low to send a brush discharge current through said medium, ionizing said intermediate ionizable medium by said emitted alpha rays to produce an ionization current whose maximum is substantially a saturation ionization current, said ionization current being produced through said ionizable medium between said electrodes, applying the entire test body in planar form and parallel to said proximate faces between said electrodes to obstruct only a part of said emitted alpha rays, the ray-emitting area being greater than the area of said test body, said test body absorbing the alpha rays which are emitted from the respective obstructed part of said ray-emitting area, said maximum saturation ionization current being thus decreased to a smaller saturation ionization current by said obstruction, and measuring the electrical effect which is produced by said decrease in maximum saturation ionization current to a smaller saturation ionization current.

9. A method according to claim 8, in which said alpha rays move in substantially parallel paths through said intermediate ionizing medium, said paths being substantially parallel to the lines of electrostatic force between said electrodes.

10. A method according to claim 8, in which said difference of potential is unidirectional and substantially constant.

11. A method according to claim 8, in which said alpha rays move in substantially parallel paths through said intermediate ionizing medium, and said difference of potential is unidirectional and substantially constant, said paths being substantially parallel to the lines of electrostatic force between said electrodes.

12. Apparatus for making an area measurement of a body which obstructs alpha rays, comprising spaced electrodes, an ionizable medium located between said electrodes so that an ionization current can be sent between said electrodes through said medium when said medium is ionized, a source of unidirectional and substantially constant potential whose respective terminals are respectively connected to said electrodes, at least one of said electrodes having connected radio-active material which emits alpha rays whose range exceeds the spacing between said electrodes, the potential of said source being selected to limit the maximum ionization current through said medium to a saturation ionization current whose value measures the alpha-ray emission of said radio-active material, the spacing between said electrodes being sufficient so that said test body can be located between said electrodes.

13. Apparatus according to claim 12, in which said electrodes are shaped to produce an intermediate electrostatic field whose lines of force are substantially parallel.

14. Apparatus according to claim 12, in which said electrodes have associated collimating means to compel said alpha rays to move in substantially parallel paths through said medium, said electrodes being shaped to have substantially parallel lines of electrostatic force which are substantially parallel to said paths.

15. Apparatus according to claim 12, in which said radio-active material is an exposed surface layer of polonium, said exposed surface layer being on one face of a sheet of metal foil whose other face is connected to the respective electrode, the proximate faces of said electrodes being shaped to produce an electrostatic field whose lines of force are substantially parallel, said exposed surface layer having the same shape as said proximate faces.

16. Apparatus according to claim 12, in which said radio-active material is an exposed surface layer of polonium, said exposed surface layer being on one face of a sheet of metal foil whose other face is connected to the respective electrode, the proximate faces of said electrodes being shaped to produce an electrostatic field whose lines of force are substantially parallel, said exposed surface layer having the same shape as said proximate faces, one of said electrodes having collimating metal means connected thereto, said collimating means being located and shaped to cause the alpha rays to move in substantially parallel paths through said medium, said paths being substantially parallel to said lines of force.

MARIETTA BLAU.
JACK R. CARLIN.

REFERENCES CITED

The following references are of record in the file of this patent:

UNITED STATES PATENTS

| Number | Name | Date |
|---|---|---|
| 1,808,709 | Blake | June 2, 1931 |
| 2,094,318 | Failla | Sept. 28, 1937 |
| 2,383,820 | Rosenblum | Aug. 28, 1945 |

FOREIGN PATENTS

| Number | Country | Date |
|---|---|---|
| 601,545 | France | Dec. 1, 1925 |